United States Patent
Chen et al.

(10) Patent No.: US 10,932,197 B2
(45) Date of Patent: Feb. 23, 2021

(54) WIRELESS COMMUNICATION METHOD AND DEVICE

(71) Applicant: GUANGDONG OPPO MOBILE TELECOMMUNICATIONS CORP., LTD., Guangdong (CN)

(72) Inventors: Wenhong Chen, Guangdong (CN); Zhihua Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/850,607

(22) Filed: Apr. 16, 2020

(65) Prior Publication Data

US 2020/0245253 A1  Jul. 30, 2020

Related U.S. Application Data

(63) Continuation of application No. PCT/CN2017/106933, filed on Oct. 19, 2017.

(51) Int. Cl.
| | |
|---|---|
| *H04W 52/08* | (2009.01) |
| *H04W 52/10* | (2009.01) |
| *H04W 52/24* | (2009.01) |
| *H04W 52/36* | (2009.01) |
| *H04W 52/42* | (2009.01) |

(52) U.S. Cl.
CPC ........... *H04W 52/08* (2013.01); *H04W 52/10* (2013.01); *H04W 52/242* (2013.01); *H04W 52/246* (2013.01); *H04W 52/36* (2013.01); *H04W 52/42* (2013.01)

(58) Field of Classification Search
CPC ............................................... H04W 52/00–60
See application file for complete search history.

(56) References Cited

U.S. PATENT DOCUMENTS

| | | | |
|---|---|---|---|
| 2018/0302889 A1* | 10/2018 | Guo ...................... | H04L 5/0053 |
| 2018/0310257 A1* | 10/2018 | Papasakellariou .... | H04W 52/30 |
| 2019/0044681 A1* | 2/2019 | Zhang ................... | H04L 5/0094 |
| 2019/0074882 A1* | 3/2019 | Zhou ...................... | H04L 5/005 |

(Continued)

FOREIGN PATENT DOCUMENTS

| | | |
|---|---|---|
| CN | 102938930 A | 2/2013 |
| CN | 103379605 A | 10/2013 |
| WO | WO2013119167 A1 | 8/2013 |

OTHER PUBLICATIONS

International search report for PCT/CN2017/106933, dated Jun. 27, 2018.

(Continued)

*Primary Examiner* — Raymond S Dean
(74) *Attorney, Agent, or Firm* — Perkins Coie LLP

(57) ABSTRACT

Embodiments of this application provide a wireless communications method and device, to perform appropriate power control on an SRS. The method includes: obtaining a closed-loop power control parameter for a sounding reference signal SRS resource set according to a first uplink signal or a first downlink signal corresponding to the SRS resource set; determining a target transmit power for the SRS resource set according to the closed-loop power control parameter; and sending an SRS to a network device on an SRS resource in the SRS resource set according to the target transmit power.

15 Claims, 3 Drawing Sheets

(56) References Cited

U.S. PATENT DOCUMENTS

2019/0103949 A1* 4/2019 Harrison ............... H04L 5/0091
2019/0230603 A1* 7/2019 Liu ....................... H04W 52/58

OTHER PUBLICATIONS

ZTE, Offline summary for AI 7.6 NR UL power control, 3GPP TSG RAN WG1 Meeting #90bis, R1-1718883, Oct. 13, 2017.
R1-1718883 ZTE Offline summary for AI 7.6 NR UL power control Oct. 13, 2017.
R1-1719189 ZTE Offline summary for AI 7.6 NR UL power control Oct. 13, 2017.
17929108.3-European search report dated Sep. 22, 2020.
R1-1718883- ZTE Offline summary for Al 7.6 NRUL power control Oct. 9-13, 2017.
R1-1717408 Intel Corporation Remaining Details on UL Power Control Framework Oct. 9-13, 2017.
R1-1718177 NTT Docomo, Inc. Work plan for Rel-15 NR WI Oct. 9-13, 2017.

* cited by examiner

WIRELESS COMMUNICATION METHOD AND DEVICE

CROSS-REFERENCE TO RELATED APPLICATIONS

The application is a continuation application of PCT Application No. PCT/CN2017/106933 filed on Oct. 19, 2017, the disclosure of which is incorporated by reference herein in its entity.

TECHNICAL FIELD

This application relates to the communications field, and more specifically, to a wireless communications method and device.

RELATED ART

In a new radio (New Radio, NR) system, uplink beam management including transmit beam management and receive beam management may be performed based on a sounding reference signal (Sounding Reference Signal, SRS). For the transmit beam management, a terminal sends SRSs in a plurality of SRS resources by using different beams, and a network side selects at least one SRS resource based on received signal strengths in a plurality of SRS resources and indicates the SRS resource to the terminal, so that the terminal transmits data by using a beam corresponding to the SRS resource. For the receive beam management, the terminal sends SRSs in one or more SRS resources by using the same beam, and the network side receives SRS signals on a plurality of SRS resources based on different receive beams, and selects, according to a received signal strengths, a receive beam used to receive data. In an NR system, a transmit antenna may further be selected based on SRSs or channel state information (Channel State Information, CSI) may further be obtained based on SRSs.

The selection of a transmit power of an SRS signal significantly affects selection of a receive beam and a transmit beam, selection of a transmit antenna, obtaining of channel state information (Channel State Information, CSI) or the like in beam management.

Therefore, how to perform power control on an SRS signal is a problem that urgently needs to be resolved.

SUMMARY

Embodiments of this application provide a wireless communications method and device, to perform appropriate power control on an SRS.

A first aspect provides a wireless communications method, including:

determining a closed-loop power control parameter for a sounding reference signal SRS resource set according to a first uplink signal or a first downlink signal corresponding to the SRS resource set;

determining a target transmit power for the SRS resource set according to the closed-loop power control parameter; and sending an SRS to a network device on an SRS resource in the SRS resource set according to the target transmit power.

Therefore, in this embodiment of this application, a terminal device determines a closed-loop power control parameter for an SRS resource set according to a first uplink signal or a first downlink signal corresponding to the SRS resource set; and determines a target transmit power for the SRS resource set according to the closed-loop power control parameter, so that an appropriate transmit power may be selected to send an SRS.

With reference to the first aspect, in a possible implementation of the first aspect, the determining a closed-loop power control parameter for an SRS resource set includes:

determining the same closed-loop power control parameter for SRS resources in the SRS resource set.

With reference to the first aspect or any possible implementation in the foregoing, in another possible implementation of the first aspect, the determining a closed-loop power control parameter for a sounding reference signal SRS resource set according to a first uplink signal or a first downlink signal corresponding to the SRS resource set includes:

determining the closed-loop power control parameter for an SRS resource in the SRS resource set according to the same first uplink signal or first downlink signal.

With reference to the first aspect or any possible implementation in the foregoing, in another possible implementation of the first aspect, the determining a target transmit power for the SRS resource set includes:

determining the same target transmit power for SRS resources in the SRS resource set.

With reference to the first aspect or any possible implementation in the foregoing, in another possible implementation of the first aspect, before the determining a closed-loop power control parameter for a sounding reference signal SRS resource set according to a first uplink signal or a first downlink signal corresponding to the SRS resource set, the method further includes:

receiving first indication information of the network device, where the first indication information is used to indicate the first uplink signal or the first downlink signal corresponding to the SRS resource set or is used to indicate a resource that carries the first uplink signal or a resource that carries the first downlink signal.

With reference to the first aspect or any possible implementation in the foregoing, in another possible implementation of the first aspect, the first uplink signal is an SRS, a physical uplink shared channel PUSCH, a physical uplink control channel PUCCH, a physical random access channel PRACH, a demodulation reference signal DMRS or a phase tracking reference signal PTRS.

With reference to the first aspect or any possible implementation in the foregoing, in another possible implementation of the first aspect, the first uplink signal is an SRS transmitted on one SRS resource in the SRS resource set; or the first uplink signal is an SRS transmitted on an SRS resource indicated by latest SRS resource indication information received by the terminal device; or the first uplink signal is a latest SRS transmitted by the terminal device on another SRS resource outside the SRS resource set.

With reference to the first aspect or any possible implementation in the foregoing, in another possible implementation of the first aspect, that the first uplink signal is an SRS transmitted on one SRS resource in the SRS resource set includes:

the first uplink signal is an SRS transmitted on an SRS resource with the lowest SRS resource index in the SRS resource group; or the first uplink signal is an SRS transmitted on the earliest SRS resource in the SRS resource group.

With reference to the first aspect or any possible implementation in the foregoing, in another possible implementation of the first aspect, the another SRS resource is an SRS resource used by the network device to obtain channel state information CSI.

With reference to the first aspect or any possible implementation in the foregoing, in another possible implementation of the first aspect, the determining a closed-loop power control parameter for a sounding reference signal SRS resource group according to a first uplink signal or a first downlink signal corresponding to the SRS resource group includes:

determining a closed-loop power control parameter used to calculate a transmit power of the first uplink signal as the closed-loop power control parameter corresponding to the SRS resource group.

With reference to the first aspect or any possible implementation in the foregoing, in another possible implementation of the first aspect, the first downlink signal is a downlink signal used to obtain a path loss estimate for performing power control on the SRS resource group.

With reference to the first aspect or any possible implementation in the foregoing, in another possible implementation of the first aspect, the downlink signal is a channel state information reference signal CSI-RS or a synchronization signal block.

With reference to the first aspect or any possible implementation in the foregoing, in another possible implementation of the first aspect, the determining a closed-loop power control parameter for an SRS resource group according to a first uplink signal or a first downlink signal corresponding to the SRS resource group includes:

determining an index of a slot in which the first downlink signal is transmitted as an index of a slot in a closed-loop power adjustment function used to perform power control on the SRS resource group.

With reference to the first aspect or any possible implementation in the foregoing, in another possible implementation of the first aspect, the SRS resource group includes a plurality of SRS resources, and the sending an SRS to a network device on an SRS resource in the SRS resource group according to the target transmit power includes:

sending SRSs respectively to the network device on different SRS resources in the SRS resource group according to the target transmit power and by using different transmit beams or different transmit antennas.

With reference to the first aspect or any possible implementation in the foregoing, in another possible implementation of the first aspect, the SRS resource set is an SRS resource set used for performing uplink beam management, used for selecting a transmit antenna or used for obtaining CSI.

With reference to the first aspect or any possible implementation in the foregoing, in another possible implementation of the first aspect, the SRS resource set is used to carry a group of aperiodic SRS transmissions triggered by one piece of aperiodic SRS trigger signaling; or the SRS resource set is used to carry a group of continuous SRS transmissions activated by one piece of continuous SRS activation signaling.

With reference to the first aspect or any possible implementation in the foregoing, in another possible implementation of the first aspect, the closed-loop power control parameter is a closed-loop power adjustment value, an index of a slot in the closed-loop power adjustment function or an index of a closed-loop power control process in the closed-loop power adjustment function.

A second aspect provides a wireless communications method, including:

determining a target transmit power for a sounding reference signal SRS resource set by using an index of a time unit occupied by a reference resource as a closed-loop power control parameter; and sending an SRS to a network device on an SRS resource in the SRS resource set according to the target transmit power.

Therefore, in this embodiment of this application, a terminal device determines a target transmit power for a sounding reference signal SRS resource set by using an index of a time unit occupied by a reference resource as a closed-loop power control parameter, so that an appropriate transmit power may be selected to send an SRS.

With reference to the second aspect, in a possible implementation of the second aspect, the determining a target transmit power for a sounding reference signal SRS resource set by using an index of a time unit occupied by a reference resource as a closed-loop power control parameter includes:

determining the target transmit power for SRS resources in the SRS resource set by using an index of a time unit occupied by the same reference resource as the closed-loop power control parameter.

With reference to the second aspect or any possible implementation in the foregoing, in another possible implementation of the second aspect, the determining a target transmit power for an SRS resource set includes:

determining the same target transmit power for SRS resources in the SRS resource set.

With reference to the second aspect or any possible implementation in the foregoing, in another possible implementation of the second aspect, before the determining a target transmit power for an SRS resource set by using an index of a time unit occupied by a reference resource as a closed-loop power control parameter, the method further includes:

receiving first indication information of the network device, where the first indication information is used to indicate a reference resource corresponding to the SRS resource set.

With reference to the second aspect or any possible implementation in the foregoing, in another possible implementation of the second aspect, the reference resource is one SRS resource in the SRS resource set; or the reference resource is an SRS resource indicated by latest SRS resource indication information received by the terminal device; or the reference resource is a latest SRS resource on which the terminal device receives an SRS, and the SRS resource is another SRS resource outside the SRS resource set; or the reference resource is the SRS resource set.

With reference to the second aspect or any possible implementation in the foregoing, in another possible implementation of the second aspect, that the reference resource is one SRS resource in the SRS resource set includes:

the reference resource is an SRS resource with the lowest SRS resource index in the SRS resource set; or the reference resource is the earliest SRS resource in the SRS resource set.

With reference to the second aspect or any possible implementation in the foregoing, in another possible implementation of the second aspect, if the reference resource occupies a plurality of time units, the terminal device uses an index of the first time unit occupied by the reference resource as the closed-loop power control parameter.

With reference to the second aspect or any possible implementation in the foregoing, in another possible implementation of the second aspect, the another SRS resource is an SRS resource used by the network device to obtain channel state information CSI.

With reference to the second aspect or any possible implementation in the foregoing, in another possible implementation of the second aspect, the reference resource is a resource occupied by a downlink signal used to obtain a path loss estimate for performing power control on the SRS resource set.

With reference to the second aspect or any possible implementation in the foregoing, in another possible implementation of the second aspect, the downlink signal is a channel state information reference signal CSI-RS or a synchronization signal block.

With reference to the second aspect or any possible implementation in the foregoing, in another possible implementation of the second aspect, the SRS resource set includes a plurality of SRS resources, and the sending an SRS to a network device on an SRS resource in the SRS resource set according to the target transmit power includes:

sending SRSs respectively to the network device on different SRS resources in the SRS resource set according to the target transmit power and by using different transmit beams or different transmit antennas.

With reference to the second aspect or any possible implementation in the foregoing, in another possible implementation of the second aspect, the SRS resource set is an SRS resource set used for performing uplink beam management, used for selecting a transmit antenna or used for obtaining CSI.

With reference to the second aspect or any possible implementation in the foregoing, in another possible implementation of the second aspect, the SRS resource set is used to carry a group of aperiodic SRS transmissions triggered by one piece of aperiodic SRS trigger signaling; or the SRS resource set is used to carry a group of continuous SRS transmissions activated by one piece of continuous SRS activation signaling.

A third aspect provides a terminal device, configured to perform the method in any aspect in the foregoing or any possible implementation of the aspect. Specifically, the terminal device includes functional modules configured to perform the method in any aspect in the foregoing or any possible implementation of the aspect.

A fourth aspect provides a terminal device, including a processor, a memory, and a transceiver. The processor, the memory, and the transceiver communicate with each other through internal connection channels to transfer control and/or data signals, to enable the network device to perform the method in any aspect in the foregoing or any possible implementation of the aspect.

A fifth aspect provides a computer readable medium, configured to store a computer program, the computer program including an instruction used to perform the method in any aspect in the foregoing or any possible implementation of the aspect.

A sixth aspect provides a computer program product including an instruction, where the instruction enables, when being executed on the computer, the computer to perform the method in any aspect in the foregoing or any possible implementation of the aspect.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following descriptions show merely some embodiments of this application, and a person of ordinary skill in the art may still derive other drawings from these accompanying drawings without creative efforts.

DETAILED DESCRIPTION

The following describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The technical solutions according to the embodiments of this application may be applied to a variety of communications systems, such as a Global System for Mobile Communications (Global System for Mobile Communications, "GSM" for short) system, a Code Division Multiple Access (Code Division Multiple Access, "CDMA" for short) system, a Wideband Code Division Multiple Access (Wideband Code Division Multiple Access, "WCDMA" for short) system, a General Packet Radio Service (General Packet Radio Service, "GPRS" for short) system, a Long Term Evolution (Long Term Evolution, "LTE" for short) system, an LTE Frequency Division Duplex (Frequency Division Duplex, "FDD" for short) system, an LTE Time Division Duplex (Time Division Duplex, "TDD" for short), a Universal Mobile Telecommunications system (Universal Mobile Telecommunications system, "UMTS" for short), a Worldwide Interoperability for Microwave Access (Worldwide Interoperability for Microwave Access, "WiMAX" for short) communications system, a future 5G system (which may also be referred to as a New Radio (New Radio, NR) system) or the like.

Figure 1:
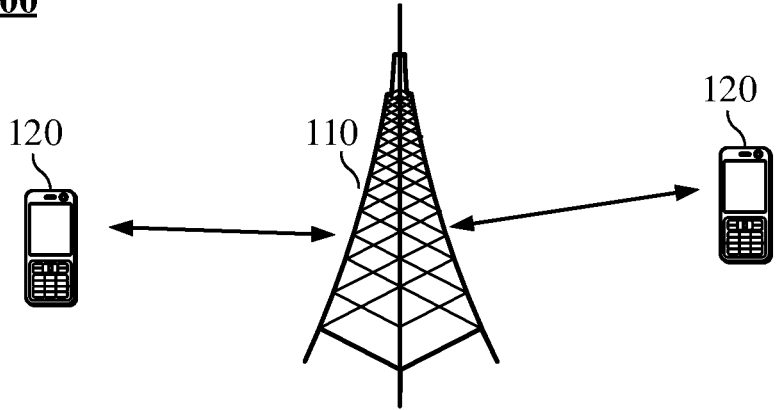
FIG. 1 is a schematic diagram of a wireless communications system according to an embodiment of this application.

FIG. 1 shows a wireless communications system 100 according to an embodiment of this application. As shown in FIG. 1, the wireless communications system 100 may include a network device 110. The network device 110 may be a device communicating with a terminal device. The network device 110 may provide communication coverage for a specific geographic area, and may communicate with a terminal device (for example, UE) located within the area with coverage. Optionally, the network device 110 may be a base transceiver station (Base Transceiver Station, BTS) in a GSM system or a CDMA system, may be a NodeB (NodeB, NB) in a WCDMA system, or may be an evolved Node B (Evolved Node B, eNB or eNodeB) in an LTE system or a wireless controller in a cloud radio access network (Cloud Radio Access Network, CRAN), or the network device may be a relay station, an access point, an in-vehicle device, a wearable device, a network-side device in a future 5G network, a network device in a future evolved public land mobile network (Public Land Mobile Network, PLMN), or the like.

The wireless communications system 100 further includes at least one terminal device 120 located within a coverage range of the network device 110. The terminal device 120 may be mobile or fixed. Optionally, the terminal device 120 may be an access terminal, user equipment (User Equipment, UE), a user unit, a user station, a mobile site, a mobile station, a remote station, a remote terminal, a mobile device, a user terminal, a terminal, a wireless communications device, a user agent, or a user apparatus. The access terminal may be a cellular phone, a cordless phone, a Session Initiation Protocol (Session Initiation Protocol, SIP) phone, a wireless local loop (Wireless Local Loop, WLL) station, a personal digital assistant (Personal Digital Assistant, PDA), a handheld device having a wireless communication function, a computing device or another processing device connected to a wireless modem, an in-vehicle device, a wearable device, a terminal device in a future 5G network, a terminal device in a future evolved PLMN, or the like.

Optionally, the terminal device 120 may perform device to device (Device to Device, D2D) communication.

Optionally, a 5G system or network may be further referred to as a new radio (New Radio, NR) system or network.

FIG. 1 exemplarily shows one network device and two terminal devices. Optionally, the wireless communications system 100 may include a plurality of network devices and another quantity of terminal devices may be included in a coverage area of each network device. This is not limited in this embodiment of this application.

Optionally, the wireless communications system 100 may further include another network entity such as a network controller and a mobility management entity. This is not limited in this embodiment of this application.

It should be understood that terms "system" and "network" in this specification are usually interchangeably used in this specification. The term "and/or" in this specification is only an association relationship for describing the associated objects, and indicates that three relationships may exist, for example, A and/or B may indicate the following three cases: A exists separately, both A and B exist, and B exists separately. In addition, the character "/" in this specification generally indicates an "or" relationship between the associated objects.

Figure 2:
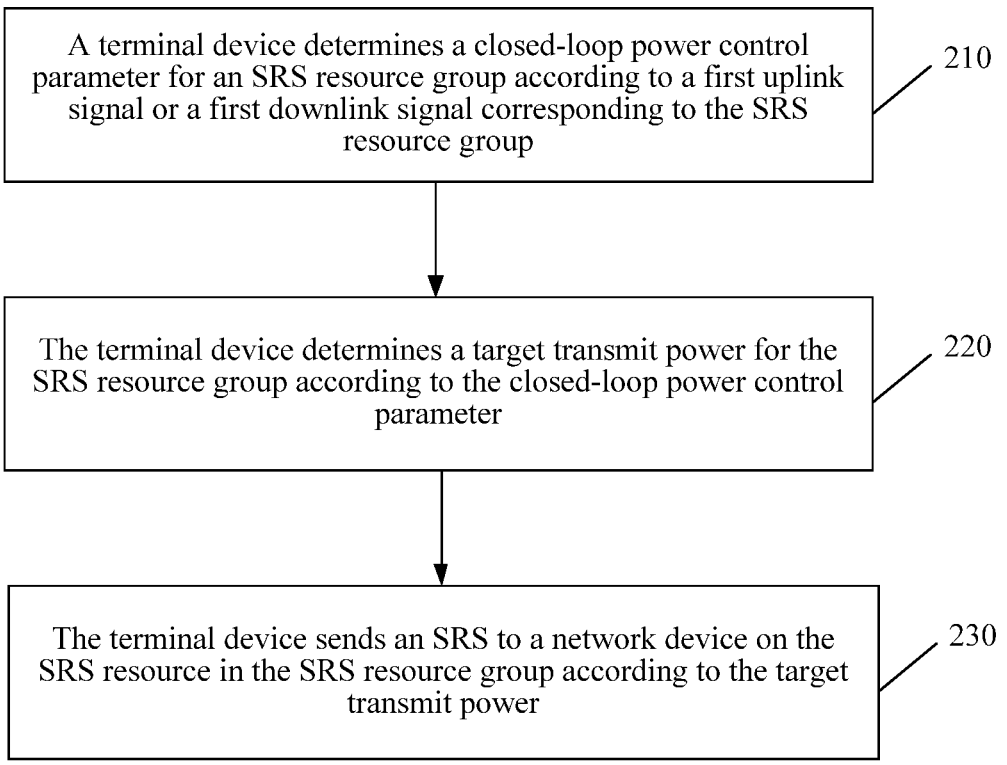
FIG. 2 is a schematic flowchart of a wireless communications method according to an embodiment of this application.

FIG. 2 is a schematic flowchart of a wireless communications method 200 according to an embodiment of this application. The method 200 may be optionally applied to the system shown in FIG. 1, but is not limited thereto. The method 200 may be optionally performed by a terminal device.

As shown in FIG. 2, the method 200 includes at least some of the following content.

210. The terminal device determines a closed-loop power control parameter for an SRS resource set according to a first uplink signal or a first downlink signal corresponding to the SRS resource set.

It should be understood that in this embodiment of this application, that the terminal device determines a closed-loop power control parameter for an SRS resource set may be understood as that the terminal device determines a closed-loop power control parameter for an SRS resource in the SRS resource set. In some cases, the two cases are interchangeable. Optionally, the SRS resource set may include one or more SRS resources.

Optionally, a network device may configure the SRS resource in the SRS resource set, or a configuration of the SRS resource in the SRS resource set may be preset.

Optionally, the configuration of each SRS resource in the SRS resource set may include at least one configuration in the following: an SRS sending period on the SRS resource, an occupied time domain resource, an occupied frequency domain resource, an occupied spatial domain resource, a used code domain resource, SRS sending times that exists after trigger signaling is received, and/or the like.

Optionally, each SRS resource in the SRS resource set may have an independent configuration parameter, for example, an SRS sending period, an occupied time domain resource, an occupied frequency domain resource, an occupied spatial domain resource, a used code domain resource, SRS sending times that exists after trigger signaling is received, and/or the like. These independent configuration parameters may have different values for SRS resources.

Optionally, the SRS resources in the SRS resource set may have a common configuration parameter, for example, an SRS sending period. That is, the SRS resources may have different SRS sending periods.

It should be understood that the SRS resources in the SRS resource set in this embodiment of this application may have the same SRS sending period. In this case, in each SRS sending period, an SRS is sent on all the SRS resources. The method mentioned in this embodiment of this application may be applied to sending of an SRS resource in each period.

Optionally, the SRS resource set is an SRS resource set used for performing uplink beam management.

Specifically, the uplink beam management performed based on an SRS may include transmit beam management and receive beam management.

For the transmit beam management, the terminal device sends SRSs in a plurality of SRS resources by using different beams, and the network device selects at least one SRS resource based on received signal strengths in a plurality of SRS resources and indicates the SRS resource to the terminal device, so that the terminal device may use a beam corresponding to the SRS resource to transmit data to the network device.

For the receive beam management, the terminal device may use the same beam to send an SRS on one or more SRS resources, and the network device receives SRS signals on a plurality of SRS resources based on different receive beams, and selects, according to a received signal strengths, a receive beam used to receive data.

Optionally, the SRS resource set an SRS resource set used for selecting a transmit antenna.

Specifically, the terminal device uses different transmit antennas to send SRSs on a plurality of SRS resources, and the network device selects at least one SRS resource based on received signal strengths in a plurality of SRS resources and indicates the SRS resource to the terminal device, so that the terminal device may use a transmit antenna corresponding to the SRS resource to transmit data to the network device.

Optionally, the SRS resource set is used for obtaining CSI. The CSI may be CSI of an uplink channel or CSI of a downlink channel. If the SRS resource set is used for obtaining CSI of a downlink channel, this application may be used for a scenario with uplink and downlink reciprocity.

Optionally, the SRS resource set is used to carry a group of aperiodic SRS transmissions triggered by one piece of aperiodic SRS trigger signaling.

Specifically, the network device may trigger aperiodic SRS trigger signaling as required. After receiving the aperiodic SRS trigger signaling, the terminal device may use the SRS resource set to transmit a group of aperiodic SRS transmissions. The aperiodic SRS trigger signaling may be carried in DCI.

Optionally, the SRS resource set is used to carry a group of continuous SRS transmissions activated by one piece of continuous SRS activation signaling.

Specifically, the network device may use SRS activation signaling to activate continuous SRS transmissions. After receiving the SRS activation signaling, the terminal device may use the SRS resource set to transmit a group of continuous SRS transmissions. The continuous SRS transmissions may be periodic SRS transmissions.

Optionally, the terminal device may determine the same closed-loop power control parameter for SRS resources in the SRS resource set.

It should be understood that, if the same closed-loop power control parameter is used for each SRS resource, only one closed-loop power control parameter may be determined for one SRS resource set (that is, the closed-loop power control parameter may only need to be determined once), and it may be not necessary to determine one closed-loop power control parameter for each resource.

Specifically, for both transmit beam management and receive beam management, the terminal device may use the same transmit power for SRS signals sent on different SRS resources. In this case, the network device may select a more appropriate transmit/receive beam according to receive signal strength. If the same closed-loop power control parameter is determined for SRS resources in the SRS resource set, the same transmit power or similar transmit powers may be determined, so that the terminal device may use the same transmit power or similar transmit powers to send an SRS resource.

Optionally, the closed-loop power control parameter is determined for an SRS resource in the SRS resource set according to the same first uplink signal or first downlink signal.

Specifically, to determine the same closed-loop power control parameter or similar closed-loop power control parameters, the terminal device may determine the closed-loop power control parameter for the SRS resources in the SRS resource set according to the same first uplink signal or first downlink signal.

Optionally, a closed-loop power control parameter used to calculate a transmit power of the first uplink signal is determined as the closed-loop power control parameter.

For example, when the first uplink signal is a latest sent PUCCH, a closed-loop power control parameter used to calculate a transmit power of the PUCCH may be used as the closed-loop power control parameter determined for the SRS resource set.

For example, when the first uplink signal is an SRS transmitted on one SRS resource in the SRS resource set, a closed-loop power control parameter may be calculated for the SRS resource, and the calculated closed-loop power control parameter is used as the closed-loop power control parameter corresponding to all SRS resources in the SRS resource set.

For example, when the first uplink signal is an SRS transmitted on an SRS resource indicated by a latest received SRI, the terminal device may determine, when receiving the SRI, a closed-loop power control parameter used to send the SRS on the SRS resource indicated by the SRI, and use the closed-loop power control parameter as the closed-loop power control parameter corresponding to all SRS resources in the SRS resource set. Certainly, the terminal device may alternatively redetermine, when receiving the SRI, a closed-loop power control parameter for the SRS resource indicated by the SRI, and use the calculated closed-loop power control parameter as the closed-loop power control parameter corresponding to all SRS resources in the SRS resource set.

Optionally, before the determining, by the terminal device, a closed-loop power control parameter for an SRS resource set according to a first uplink signal or a first downlink signal corresponding to the SRS resource set, the terminal device may select the first uplink signal or the first downlink signal used to determine the closed-loop power control parameter.

Certainly, the determining the closed-loop power control parameter according to the first uplink signal or the first downlink signal mentioned in this embodiment of this application may be determining the closed-loop power control parameter according to a resource occupied by the first uplink signal or the first uplink signal. In this case, it means that the terminal device may not need to determine the first uplink signal or the first downlink signal, but instead uses a resource of the first uplink signal or the first downlink signal. That is, provided that the resource of the first uplink signal or the first downlink signal mentioned in this embodiment of this application is used to determine the closed-loop power control parameter, the determining falls within the protection scope of this embodiment of this application.

In an implementation, the terminal device receives first indication information sent by the network device, where the first indication information is used to indicate the first uplink signal or the first downlink signal corresponding to the SRS resource set or is used to indicate a resource that carries the first uplink signal, a resource that carries the first downlink signal or a resource on which a first beam or a first beam pair is used to receive or send a signal.

Specifically, the network device may indicate, according to an actual case, the first uplink signal or the first downlink signal used by the terminal device to determine the closed-loop power control parameter or indicate a resource that carries the first uplink signal or a resource that carries the first downlink signal.

For example, assuming that the network device requires that the terminal device use a relatively high transmit power to send an SRS, an uplink signal or a downlink signal by using which a higher closed-loop power adjustment value may be calculated and a resource that carries the uplink signal or downlink signal may be indicated to the terminal device.

Optionally, the first indication information and configuration information of the SRS resource set may be configured for the terminal device together by using radio resource control (Radio Resource Control, RRC) signaling, or the first indication information and trigger signaling or activation signaling of the SRS resource set may be indicated to the terminal device together by using downlink control information (Downlink Control Information, DCI) or a media access control (Media Access Control, MAC) control element (Control Element, CE).

Optionally, the first indication information is used to indicate one SRS resource in the SRS resource set, so that the terminal device may determine the first uplink signal (that is, an SRS sent by using the SRS resource) based on the SRS resource, and determine the closed-loop power control parameter, or directly use the SRS resource (for example, an index of a slot occupied by the SRS resource) to determine the closed-loop power control parameter.

Alternatively, the first indication information is used to indicate one uplink signal or one downlink signal corresponding to the SRS resource set.

For example, the first indication information indicates an uplink signal carried in an SRS resource in the SRS resource set or a downlink signal carried in a CSI-RS resource corresponding to an SRS resource in the SRS resource set, so that the terminal device may determine the closed-loop power control parameter according to a resource (for example, an index of a slot occupied by the resource) occupied by the uplink signal or downlink signal.

In another implementation, the first uplink signal or the first downlink signal corresponding to the SRS resource set is determined according to a first preset relationship. Optionally, the first preset relationship is preconfigured at delivery.

Optionally, the first preset relationship may indicate which uplink signal(s) or downlink signal(s) is the first uplink signal or the first downlink signal used to determine the closed-loop power control parameter for the SRS resource set, and the first uplink signal or the first downlink signal may be selected for the SRS resource set based on the relationship.

For example, the first preset relationship indicates that the first uplink signal used to determine the closed-loop power control parameter for the SRS resource set is a latest sent physical uplink shared channel (Physical Uplink Shared Channel, PUSCH) or physical uplink control channel (Physical Uplink Control Channel, PUCCH) signal, and the terminal device may use the latest sent PUSCH or PUCCH signal as the first uplink signal.

For example, the first preset relationship indicates that the first downlink signal used to determine the closed-loop power control parameter for the SRS resource set may be a latest downlink signal used by the terminal device to determine an uplink transmit beam, and the terminal device may use the latest downlink signal used to determine the uplink transmit beam as the first downlink signal.

Optionally, the closed-loop power control parameter mentioned in this embodiment of this application may be a closed-loop power adjustment value, an index of a slot in the closed-loop power adjustment function or an index of a closed-loop power control process in the closed-loop power adjustment function.

Optionally, the terminal device determines an index of a slot in which the first downlink signal is transmitted or an index of a slot in which the first uplink signal is transmitted as an index of a slot in the closed-loop power adjustment function used to perform power control on the SRS resource set.

Specifically, a transmit power of an SRS signal may be determined by using the following formula:

$$P_{SRS,c}(i) = \min\begin{Bmatrix} P_{CMAX,c}(i), \\ P_{SRS\_OFFSET,c}(m) + 10\log_{10}(M_{SRS,c}(i)) + \\ P_{0,c}(j) + \alpha_c(j) \cdot PL_c(k) + h_c(i, 1) \end{Bmatrix},$$

where i is an index of a slot, j is an index of an open-loop power control parameter, m is an index of an SRS power offset, and k is an index of a reference signal RS resource used for path loss estimation. $h_c(i, 1)$ is a closed-loop power adjustment function, and 1 is an index of a closed-loop power control process.

The closed-loop power control parameter mentioned in this embodiment of this application may be an index i of a slot or an index 1 of a closed-loop power control process in the closed-loop power adjustment function $h_c(i, 1)$ in the foregoing formula, or may be the closed-loop power adjustment value obtained by using the closed-loop power adjustment function.

It should be understood that the closed-loop power control parameter in this embodiment of this application may be an index of a slot or may be an index of another time unit, for example, an index of an orthogonal frequency division multiplexing (Orthogonal Frequency Division Multiplexing, OFDM) symbol or an index of a subframe.

Optionally, the slot mentioned in this embodiment of this application may be a mini slot.

Optionally, the first uplink signal is an SRS, a PUSCH, a PUCCH, a PRACH, a DMRS or a PTRS.

Optionally, the first uplink signal is an SRS transmitted on one SRS resource in the SRS resource set.

In an implementation, the network device may indicate an index of the SRS resource in the SRS resource set, and the closed-loop power control parameter of the SRS resource may be used for all the other SRS resources in the SRS resource set.

In an implementation, the first uplink signal is an uplink signal transmitted on an SRS resource with the lowest SRS resource index in the SRS resource set.

In an implementation, the first uplink signal is an uplink signal transmitted on the earliest SRS resource in the SRS resource set.

Specifically, if indices of the SRS resource in the SRS resource set are arranged in an ascending order of time, the earliest SRS resource in the SRS resource set may be an SRS resource with the lowest index.

Optionally, the first uplink signal is an SRS transmitted on an SRS resource indicated by latest received SRS resource indication information (SRS Resource Indication Information, SRI).

Specifically, before receiving the SRI, the terminal device may transmit an SRS signal in an SRS resource set (where the SRS resource set may be the resource group mentioned in this embodiment of this application) that includes the SRS resource indicated by the SRI. Each SRS resource may optionally be transmitted by using one beam. The SRI is usually indicated to the terminal device by using a DCI for scheduling transmission of uplink data or scheduling transmission of uplink control information. For example, the SRI may be indicated to the terminal device by using DCI for triggering the aperiodic SRS.

Optionally, the first uplink signal is a latest SRS transmitted by the terminal device on another SRS resource outside the SRS resource set.

The other SRS resources are SRS resources used by the network device to obtain channel state information (Channel State Information, CSI). In this case, the SRS resource in the SRS resource set mentioned in this embodiment of this application may be used for performing beam management, for example, uplink beam management or downlink beam management.

Optionally, the first downlink signal is a CSI-RS, a synchronization signal, a synchronization signal block, a TRS, a PTRS, a PDSCH, a PDCCH or a DMRS.

For example, the network device may preconfigure a plurality of CSI-RS resources by using higher layer signaling, and then indicate that an index of a slot of one of the CSI-RS resources is used to determine the closed-loop power control parameter.

For example, the network device may send a plurality of synchronization signal blocks, and indicate an index of a slot used to obtain a synchronization signal block of the closed-loop power control parameter, so that the terminal device may determine the closed-loop power control parameter based on the index.

Optionally, the first downlink signal is a downlink signal used to obtain a path loss estimate for performing power control on the SRS resource set. In this case, the downlink signal is a channel state information reference signal CSI-RS or a synchronization signal block.

Specifically, during power control, the path loss estimate further needs to be determined. The terminal device may estimate a downlink path loss value based on a downlink signal, where the same downlink signal is used to estimate a downlink path loss value for SRS resources in the SRS resource set, and the downlink signal used to estimate the downlink path loss value may further be used to determine the closed-loop power control parameter.

Optionally, to calculate a corresponding path loss value for an SRS resource, a CSI-RS may be received on a CSI-RS resource corresponding to the SRS resource, and a path loss value is calculated based on a transmit power and a receive power of the CSI-RS.

Optionally, CSI-RS resources may have a one-to-one correspondence with SRS resources, or one CSI-RS resource may correspond to a plurality of SRS resources.

Optionally, a path loss value is estimated according to a receive power and a transmit power of the first downlink signal, and the estimated path loss value is determined as the path loss estimate corresponding to the SRS resource set.

For example, if the receive power is P1 and the transmit power is P2, the path loss value is denoted as PL=P1/P2. The path loss estimate is usually denoted as dB. That is, PL(dB) =10*lg(P1/P2)(dB).

Optionally, the network device may notify the terminal device of the transmit power of the first downlink signal in advance by using downlink signaling. For example, when the first downlink signal is a CSI-RS, the transmit power may be included in configuration information for sending CSI-RS resource of the CSI-RS to be notified the terminal device.

Optionally, in addition to a CSI-RS or a synchronization signal block, the first downlink signal may also be another downlink signal, for example, a physical downlink shared channel (Physical Downlink Shared Channel, PDSCH).

220. The terminal device determines a target transmit power for the SRS resource set according to the closed-loop power control parameter.

It should be understood that in this embodiment of this application, that the terminal device determines the target transmit power for an SRS resource set may be understood as that the terminal device determines the target transmit power for an SRS resource in the SRS resource set. In some cases, the two cases are interchangeable.

Optionally, the terminal device determines the same transmit power for the SRS resources in the SRS resource set.

Optionally, the terminal device determines the target transmit power for SRS resources in the SRS resource set by using the same closed-loop power control parameter.

It should be understood that, if the same transmit power is used for the SRS resources, only one transmit power may be determined for one SRS resource set, and it may be not necessary to determine one transmit power for each resource.

Optionally, the closed-loop power control parameter may be determined according to the following formula:

$$P_{SRS,c}(i) = \min\left\{\begin{array}{l}P_{CMAX,c}(i),\\ P_{SRS\_OFFSET,c}(m) + 10\log_{10}(M_{SRS,c}(i)) +\\ P_{0,c}(j) + \alpha_c(j) \cdot PL_c(k) + h_c(i, 1)\end{array}\right\},$$

where i is an index of a slot, j is an index of an open-loop power control parameter, m is an index of an SRS power offset, k is an index of a reference signal RS resource used for path loss estimation. $h_c(i, 1)$ is a closed-loop power adjustment function, and 1 is an index of a closed-loop power control process.

230. The terminal device sends an SRS to a network device on the SRS resource in the SRS resource set according to the target transmit power.

Optionally, the terminal device may send SRSs to the network device respectively on different SRS resources in the SRS resource set according to the target transmit power and by using different transmit beams, so that the network device may use the same receive beam to receive the SRSs respectively on the SRS resources in the SRS resource set, and select at least one SRS resource based on received signal strengths in a plurality of SRS resources and indicate the SRS resource to the terminal device, and the terminal device may transmit data by using a beam corresponding to the SRS resource.

Optionally, the terminal device may send SRSs to the network device respectively on different SRS resources in the SRS resource set according to the target transmit power and by using the same transmit beam, so that the network device receives SRS signals on a plurality of SRS resources based on different receive beams, and selects, according to a received signal strengths, a receive beam used to receive data.

Optionally, the terminal device may send SRSs to the network device respectively on different SRS resources in the SRS resource set according to the target transmit power and by using different transmit antennas, so that the network device may respectively receive the SRSs on the SRS resource in the SRS resource set, and select at least one SRS resource based on received signal strengths in a plurality of SRS resources and indicate the SRS resource to the terminal device, so that the terminal device may use a transmit antenna corresponding to the SRS resource to transmit data.

Therefore, in this embodiment of this application, a terminal device determines a closed-loop power control parameter for an SRS resource set according to a first uplink signal or a first downlink signal corresponding to the SRS resource set; and determines a target transmit power for the SRS resource set according to the closed-loop power control parameter, so that an appropriate transmit power may be selected to send an SRS.

Figure 3:
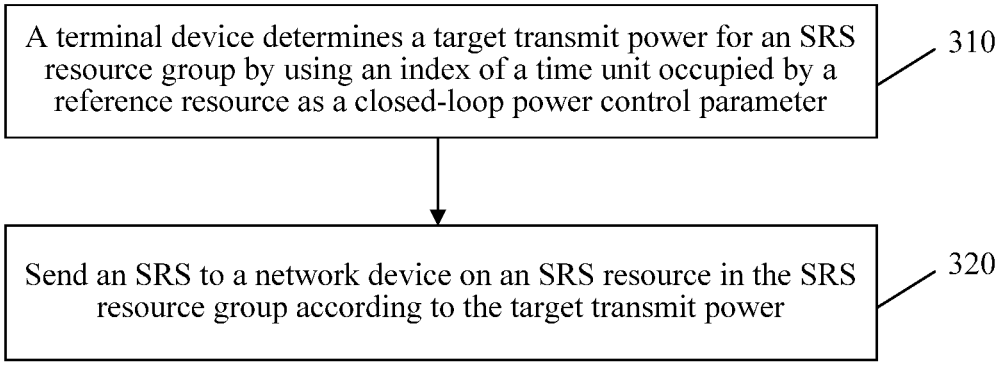
FIG. 3 is a schematic flowchart of a wireless communications method according to an embodiment of this application.

FIG. 3 is a schematic flowchart of a wireless communications method 300 according to an embodiment of this application. The method 300 includes at least some of the following content.

310. A terminal device determines a target transmit power for an SRS resource set by using an index of a time unit occupied by a reference resource as a closed-loop power control parameter.

It should be understood that the SRS resources in the SRS resource set in this embodiment of this application may have the same SRS sending period. In this case, in each SRS sending period, an SRS is sent on all the SRS resources. The method mentioned in this embodiment of this application may be applied to sending of an SRS resource in each period.

Optionally, the SRS resource set may be used for performing uplink beam management, selecting a transmit antenna or obtaining CSI.

Optionally, the time unit mentioned in this embodiment of this application may be a slot, a mini slot, an OFDM symbol or the like.

Optionally, the target transmit power is determined for SRS resources in the SRS resource set by using an index of a time unit occupied by the same reference resource as the closed-loop power control parameter.

Specifically, to determine the same closed-loop power control parameter, the terminal device may use a time unit occupied by the same reference resource as a closed-loop power control parameter corresponding to the SRS resource in the SRS resource set.

Optionally, before the determining, by a terminal device, a target transmit power for an SRS resource set by using an index of a time unit occupied by a reference resource as a closed-loop power control parameter, the terminal device may determine a reference resource.

In an implementation, the terminal device receives first indication information sent by a network device, where the first indication information is used to indicate a reference resource corresponding to the SRS resource set.

Specifically, the network device may indicate, according to an actual case, a reference resource used by the terminal device to determine the closed-loop power control parameter.

For example, when it is assumed that the network device requires that the terminal device use a relatively high transmit power to send an SRS, a reference resource by using which a higher closed-loop power adjustment value may be calculated may be indicated to the terminal device.

Optionally, the first indication information and configuration information of the SRS resource set may be configured for the terminal device together by using radio resource control (Radio Resource Control, RRC) signaling, or the first indication information and trigger signaling or activation signaling of the SRS resource set may be indicated to the terminal device together by using downlink control information (Downlink Control Information, DCI) or a media access control (Media Access Control, MAC) control element (Control Element, CE).

In another implementation, a reference resource corresponding to the SRS resource set is determined according to a first preset relationship. Optionally, the first preset relationship is preconfigured at delivery.

Optionally, the first preset relationship may indicate a reference resource used to determine the closed-loop power control parameter for the SRS resource set, and a first uplink signal or first downlink signal may be selected for the SRS resource set based on the relationship.

Optionally, if the reference resource occupies a plurality of time units, the terminal device uses an index of the first time unit occupied by the reference resource as the closed-loop power control parameter.

Optionally, the reference resource mentioned in this embodiment of this application may be an uplink resource or may be a downlink resource.

In an implementation, the reference resource is one SRS resource in the SRS resource set.

For example, the network device may indicate an index of the SRS resource in the SRS resource set, and the index of the slot occupied by the SRS resource may be used for all the other SRS resources in the SRS resource set to determine the closed-loop power control parameter.

For example, the reference resource is an SRS resource with the lowest SRS resource index in the SRS resource set.

For example, the reference resource is the earliest SRS resource in the SRS resource set.

Specifically, if indices of the SRS resource in the SRS resource set are arranged in an ascending order of time, the earliest SRS resource in the SRS resource set may be an SRS resource with the lowest index.

In an implementation, the reference resource is an SRS resource indicated by latest SRS resource indication information received by the terminal device.

Specifically, before receiving the SRI, the terminal device may transmit an SRS signal in an SRS resource set (where the SRS resource set may be the resource group mentioned in this embodiment of this application) that includes the SRS resource indicated by the SRI. Each SRS resource may optionally be transmitted by using one beam. The SRI is usually indicated to the terminal device by using a DCI for scheduling transmission of uplink data or scheduling transmission of uplink control information. For example, the SRI may be indicated to the terminal device by using DCI for triggering the aperiodic SRS.

In an implementation, the reference resource is a latest SRS resource on which the terminal device receives an SRS, and the SRS resource is another SRS resource outside the SRS resource set.

The other SRS resources are SRS resources used by the network device to obtain channel state information (Channel State Information, CSI). In this case, the SRS resource in the SRS resource set mentioned in this embodiment of this application may be used for performing beam management, for example, uplink beam management or downlink beam management.

In an implementation, the reference resource is the SRS resource set.

Specifically, the terminal device may use one slot occupied by the SRS resource set as the closed-loop power control parameter of the SRS resource set, and for example, may be the first slot occupied by the SRS resource set in a single period.

In an implementation, the reference resource is a resource occupied by a downlink signal used to obtain a path loss estimate for performing power control on the SRS resource set.

Optionally, the downlink signal is a channel state information reference signal CSI-RS or a synchronization signal block.

Optionally, the terminal device determines the same transmit power for the SRS resources in the SRS resource set.

It should be understood that, if the same transmit power is used for the SRS resources, only one transmit power may be determined for one SRS resource set, and it may be not necessary to determine one transmit power for each resource.

Optionally, the closed-loop power control parameter may be determined according to the following formula:

$$P_{SRS,c}(i) = \min\left\{\begin{array}{l} P_{CMAX,c}(i), \\ P_{SRS\_OFFSET,c}(m) + 10\log_{10}(M_{SRS,c}(i)) + \\ P_{0,c}(j) + \alpha_c(j) \cdot PL_c(k) + h_c(i, 1) \end{array}\right\},$$

where i is an index of a slot, j is an index of an open-loop power control parameter, m is an index of an SRS power offset, k is an index of a reference signal RS resource used for path loss estimation. $h_c$ (i, 1) is a closed-loop power adjustment function, and 1 is an index of a closed-loop power control process.

320. Send an SRS to a network device on an SRS resource in the SRS resource set according to the target transmit power.

Optionally, the terminal device may send SRSs to the network device respectively on different SRS resources in the SRS resource set according to the target transmit power and by using different transmit beams, so that the network device may use the same receive beam to receive the SRSs respectively on the SRS resources in the SRS resource set, and select at least one SRS resource based on received signal strengths in a plurality of SRS resources and indicate the SRS resource to the terminal device, and the terminal device may transmit data by using a beam corresponding to the SRS resource.

Optionally, the terminal device may send SRSs to the network device respectively on different SRS resources in the SRS resource set according to the target transmit power and by using the same transmit beam, so that the network device receives SRS signals on a plurality of SRS resources based on different receive beams, and selects, according to a received signal strengths, a receive beam used to receive data.

Optionally, the terminal device may send SRSs to the network device respectively on different SRS resources in the SRS resource set according to the target transmit power and by using different transmit antennas, so that the network device may receive the SRSs respectively on the SRS resources in the SRS resource set, and select at least one SRS resource based on received signal strengths in a plurality of SRS resources and indicate the SRS resource to the terminal device, and the terminal device may use a transmit antenna corresponding to the SRS resource to transmit data.

It should be understood that for the method 300, refer to the description of the method 200, for example, the description about the beam management and the SRS resource set. For brevity, details are not described herein again.

Therefore, in this embodiment of this application, a terminal device determines a target transmit power for a sounding reference signal SRS resource set by using an index of a time unit occupied by a reference resource as a closed-loop power control parameter, so that an appropriate transmit power may be selected to send an SRS.

Figure 4:
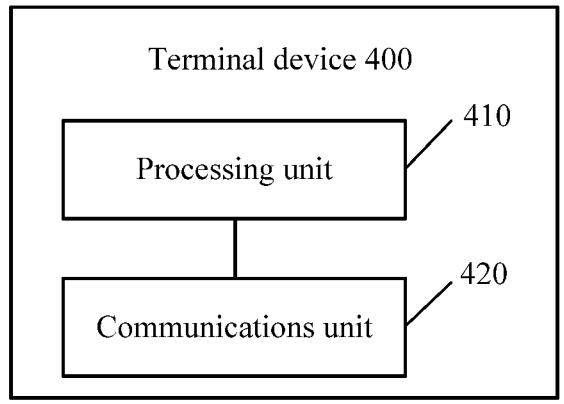
FIG. 4 is a schematic block diagram of a terminal device according to an embodiment of this application.

FIG. 4 is a schematic block diagram of a terminal device 400 according to an embodiment of this application. As shown in FIG. 4, the terminal device 400 includes processing unit 410 and a communications unit 420.

Optionally, the processing unit 410 is configured to: determine a closed-loop power control parameter for a sounding reference signal SRS resource set according to a first uplink signal or a first downlink signal corresponding to the SRS resource set; and determine a target transmit power for the SRS resource set according to the closed-loop power control parameter; and the communications unit 420 is configured to send an SRS to a network device on an SRS resource in the SRS resource set according to the target transmit power.

It should be understood that the terminal device 400 may perform the corresponding operations performed by the terminal device in the method shown in FIG. 2. For brevity, details are not described herein again.

Optionally, the processing unit 410 is configured to determine a target transmit power for a sounding reference signal SRS resource set by using an index of a time unit occupied by a reference resource as a closed-loop power control parameter; and the communications unit 420 is configured to send an SRS to a network device on an SRS resource in the SRS resource set according to the target transmit power.

It should be understood that the terminal device 400 may perform the corresponding operations performed by the terminal device in the method shown in FIG. 3. For brevity, details are not described herein again.

Figure 5:
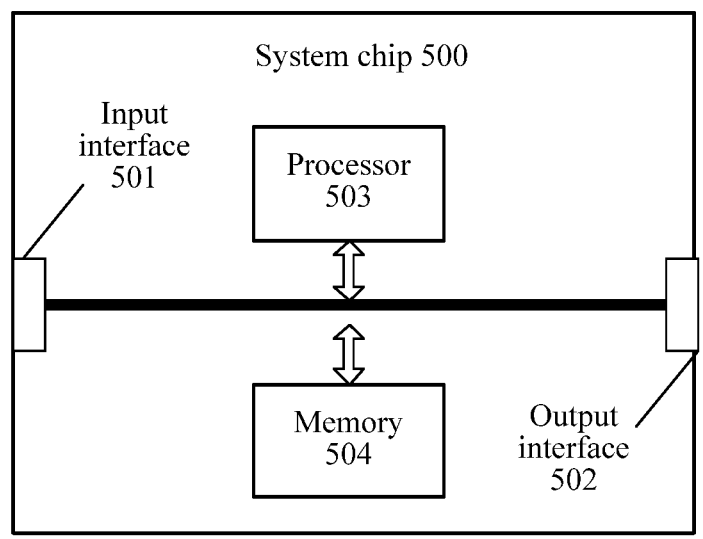
FIG. 5 is a schematic block diagram of a system chip according to an embodiment of this application.

FIG. 5 is a schematic structural diagram of a system chip 500 according to an embodiment of this application. The system chip 500 in FIG. 5 includes an input interface 501, an output interface 502, a processor 503, and a memory 504 that may be connected through an internal communication connection line, where the processor 503 is configured to execute code in the memory 504.

Optionally, when the code is executed, the processor 503 implements the method performed by the terminal device in the method embodiments. For brevity, details are not described herein again.

Figure 6:
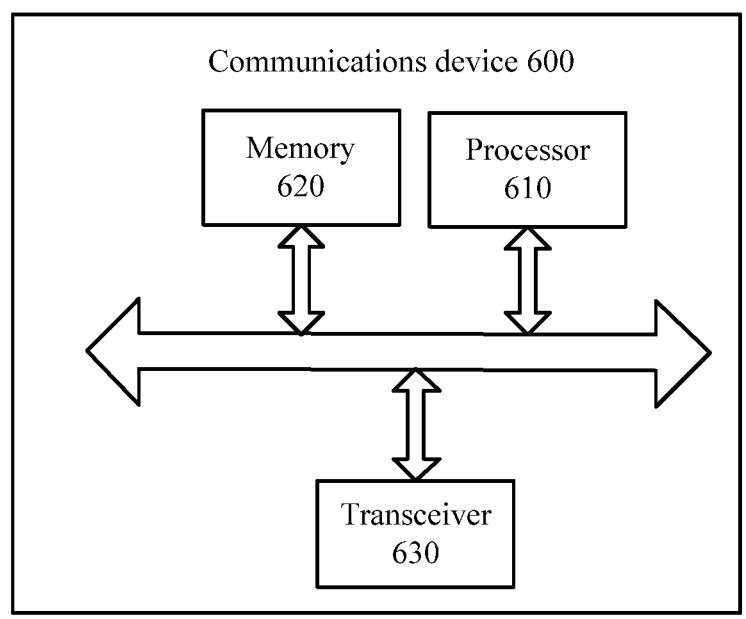
FIG. 6 is a schematic block diagram of a communications device according to an embodiment of this application.

FIG. 6 is a schematic block diagram of a communications device 600 according to an embodiment of this application. As shown in FIG. 6, the communications device 600 includes a processor 610 and a memory 620. The memory 620 may store program code, and the processor 610 may execute the program code stored in the memory 620.

Optionally, as shown in FIG. 6, the communications device 600 may include a transceiver 630, and the processor 610 may control the transceiver 630 to communicate externally.

Optionally, the processor 610 may invoke the program code stored in the memory 620 to perform the corresponding operations of the terminal device in the method embodiments. For brevity, details are not described herein again.

It should be understood that the processor in the embodiments of this application may be an integrated circuit chip and has a signal processing capability. During implementation, the steps in the foregoing method embodiments may be implemented by using an integrated logic circuit of hardware in the processor or an instruction in the form of software. The processor may be a general-purpose processor a digital signal processor (Digital Signal Processor DSP), an application specific integrated circuit (Application Specific Integrated Circuit, ASIC), a field programmable gate array (Field Programmable Gate Array, FPGA) or another programmable logic device, a discrete gate or transistor logic device, and a discrete hardware component. The methods, steps, and logic block diagrams disclosed in the embodiments of this application may be implemented or performed. The general-purpose processor may be a microprocessor or the processor may be alternatively any conventional processor or the like. The steps in the methods disclosed with reference to the embodiments of this application may be directly performed or completed by a decoding processor embodied as hardware or performed or completed by using a combination of hardware and software modules in a decoding processor. The software module may be located at a random-access memory, a flash memory, a read-only memory, a programmable read-only memory or an electrically erasable programmable memory, a register or another mature storage medium in this field. The storage medium is located at a memory, and the processor reads information in the memory and completes the steps in the foregoing methods in combination with the hardware thereof.

It may be understood that the memory in the embodiments of this application may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM) or a flash memory. The volatile memory may be a random-access memory (Random-access memory, RAM) and is used as an external cache. For exemplary rather than limitative description, many forms of RAMs can be used, and are, for example, a static random-access memory (Static RAM, SRAM), a dynamic random-access memory (Dynamic RAM, DRAM), a synchronous dynamic random-access memory (Synchronous DRAM, SDRAM), a double data rate synchronous dynamic random-access memory (Double Data Rate SDRAM, DDR SDRAM), an enhanced synchronous dynamic random-access memory (Enhanced SDRAM, ESDRAM), a synchronous link dynamic random-access memory (Synchlink DRAM, SLDRAM), and a direct Rambus random-access memory (Direct Rambus RAM, DR RAM). It should be noted that the memories in the systems and methods described herein are intended to include, but are not limited to, these memories and memories of any other suitable type.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional module and sold or used as an independent product, the functions may be stored in a computer-readable storage medium. Based on such an understanding, the technical solutions of this application essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or some of the steps of the method described in the embodiments of this application. The foregoing storage medium includes: any medium that can store program codes, such as a USB flash disk, a removable hard disk, a read-only memory (ROM, Read-Only Memory), a random-access memory (RAM, Random-access memory), a magnetic disk, or an optical disk.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communications method, comprising:
obtaining, a closed-loop power adjustment value for a sounding reference signal SRS resource set, wherein the closed-loop power adjustment value for the SRS resource set is based on a firstly transmitted SRS in time in the SRS resource set;
determining a target transmit power for each SRS resource in the SRS resource set according to the closed-loop power adjustment value for the SRS resource set; and
transmitting the SRS on the SRS resource in the SRS resource set according to the target transmit power.

2. The method according to claim 1, wherein the determining a target transmit power for the SRS resource set comprises:
determining the same target transmit power for each SRS resource in the SRS resource set.

3. The method according to claim 1, wherein the target transmit power is determined according to the following formula:

$$P_{SRS,c}(i) = \min\begin{cases} P_{CMAX,c}(i), \\ P_{SRS\_OFFSET,c}(m) + 10\log_{10}(M_{SRS,c}(i)) + \\ P_{0,c}(j) + \alpha_c(j) \cdot PL_c(k) + h_c(i, 1) \end{cases}$$

where i is an index of a slot, j is an index of an open-loop power control parameter, m is an index of an SRS power offset, k is an index of a reference signal RS resource used for path loss estimation, $h_c(i, 1)$ is a closed-loop power adjustment function, and 1 is an index of a closed-loop power control process.

4. The method according to claim 1, wherein
the SRS resource set comprises a plurality of SRS resources, and the transmitting an SRS on the SRS resource in the SRS resource set according to the target transmit power comprises:
transmitting SRSs to the network device on different SRS resources in the SRS resource set according to the target transmit power and by respectively using different transmit beams or different transmit antennas.

5. The method according to claim 1, wherein
the SRS resource set is an SRS resource set used for uplink beam management, used for obtaining channel state information CSI or used for transmit antenna switching;
SRS resource set.

6. The method according to claim 1, wherein
the SRS resource set is used to carry a group of aperiodic SRS transmissions triggered by one piece of aperiodic SRS trigger signaling; or
the SRS resource set is used to carry a group of continuous SRS transmissions activated by one piece of continuous SRS activation signaling.

7. A terminal device, comprising a processing unit and a communications unit, wherein
the processing unit is configured to: obtain a closed-loop power control parameter for a sounding reference signal SRS resource set, wherein the closed-loop power control parameter is based on a firstly transmitted SRS in time in the SRS resource set for transmitting an SRS and determine a target transmit power for the SRS resource set according to the closed-loop power control parameter; and
the communications unit is configured to send the SRS to a network device on an SRS resource in the SRS resource set according to the target transmit power.

8. The terminal device according to claim 7, wherein the processing unit is further configured to:
determine the same closed-loop power control parameter for SRS resources in the SRS resource set.

9. The terminal device according to claim 7, wherein the processing unit is further configured to:
determine the target transmit power according to the following formula:

$$P_{SRS,c}(i) = \min\begin{Bmatrix} P_{CMAX,c}(i) \\ P_{SRS\_OFFSET,c}(m) + 10\log_{10}(M_{SRS,c}(i)) + \\ P_{0,c}(j) + \alpha_c(j) \cdot PL_c(k) + h_c(i, 1) \end{Bmatrix}$$

where i is an index of a slot, j is an index of an open-loop power control parameter, m is an index of an SRS power offset, k is an index of a reference signal RS resource used for path loss estimation, $h_c$(i, 1) is a closed-loop power adjustment function, and 1 is an index of a closed-loop power control process.

10. The terminal device according to claim 7, wherein the SRS resource set comprises a plurality of SRS resources, and wherein the processing unit is further configured to:
transmit SRSs to the network device on different SRS resources in the SRS resource set according to the target transmit power and by respectively using different transmit beams or different transmit antennas.

11. The terminal device according to claim 7, wherein the SRS resource set is an SRS resource set used for uplink beam management, used for obtaining channel state information CSI or used for transmit antenna switching.

12. The terminal device according to claim 7, wherein the first downlink signal is a downlink signal used to obtain a path loss estimate for performing power control on the SRS resource set.

13. The terminal device according to claim 7, wherein the downlink signal is a channel state information reference signal CSI-RS or a synchronization signal block.

14. The terminal device according to claim 7, wherein
the SRS resource set is used to carry a group of aperiodic SRS transmissions triggered by one piece of aperiodic SRS trigger signaling; or
the SRS resource set is used to carry a group of continuous SRS transmissions activated by one piece of continuous SRS activation signaling.

15. A system chip, comprising:
a processor configured to:
obtain a closed-loop power adjustment value for a sounding reference signal SRS resource set, wherein the closed-loop power adjustment value is based on a firstly transmitted SRS in time in the SRS resource set;
determine a target transmit power for each SRS resource in the SRS resource set according to the closed-loop power adjustment value for the SRS resource set; and
transmit the SRS on the SRS resource in the SRS resource set according to the target transmit power.

* * * * *